Nov. 27, 1956  W. McK. MARTIN  2,771,645
APPARATUS FOR STERILIZING FOOD CONTAINERS
Filed Dec. 4, 1950  6 Sheets-Sheet 1

INVENTOR.
WILLIAM McK. MARTIN
BY Charles M. Fryer
ATTORNEY

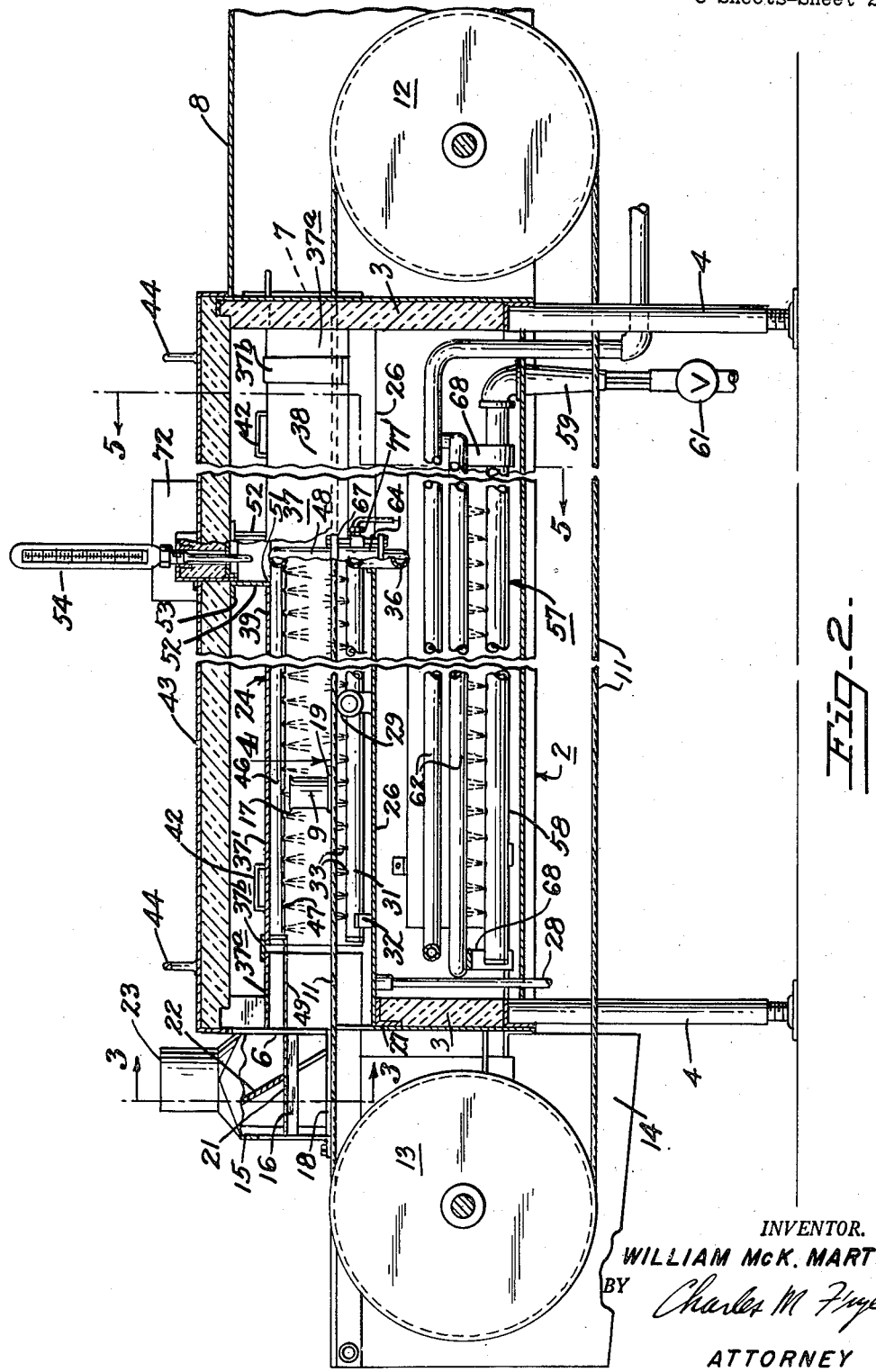

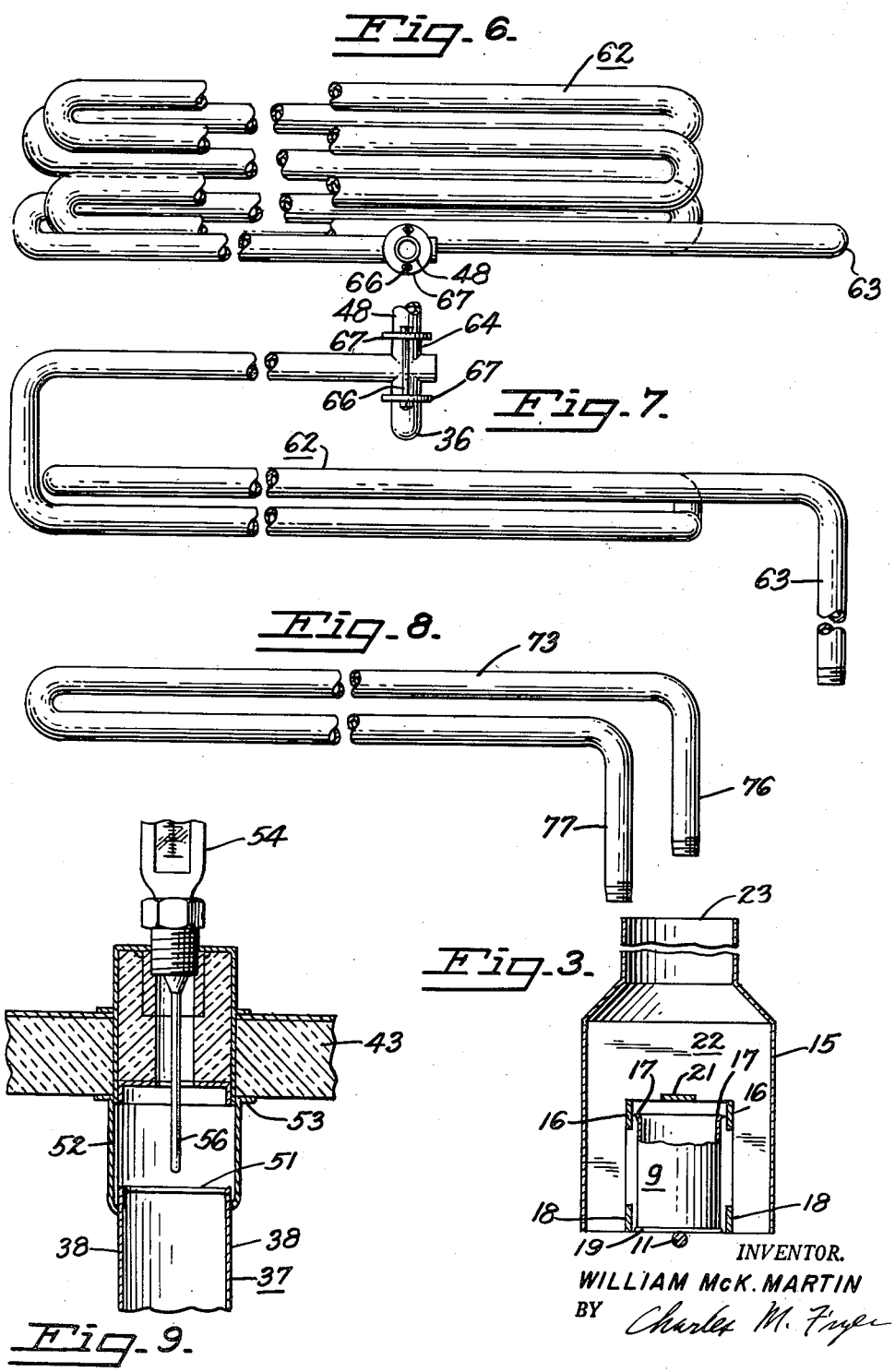

Nov. 27, 1956

W. McK. MARTIN 2,771,645

APPARATUS FOR STERILIZING FOOD CONTAINERS

Filed Dec. 4, 1950

INVENTOR.
WILLIAM McK. MARTIN
BY Charles M. Fryer
ATTORNEY

Nov. 27, 1956     W. McK. MARTIN     2,771,645
APPARATUS FOR STERILIZING FOOD CONTAINERS
Filed Dec. 4, 1950     6 Sheets-Sheet 5

INVENTOR.
WILLIAM McK. MARTIN
BY
*Charles M. Pryor*
ATTORNEY

Nov. 27, 1956   W. McK. MARTIN   2,771,645
APPARATUS FOR STERILIZING FOOD CONTAINERS
Filed Dec. 4, 1950   6 Sheets-Sheet 6
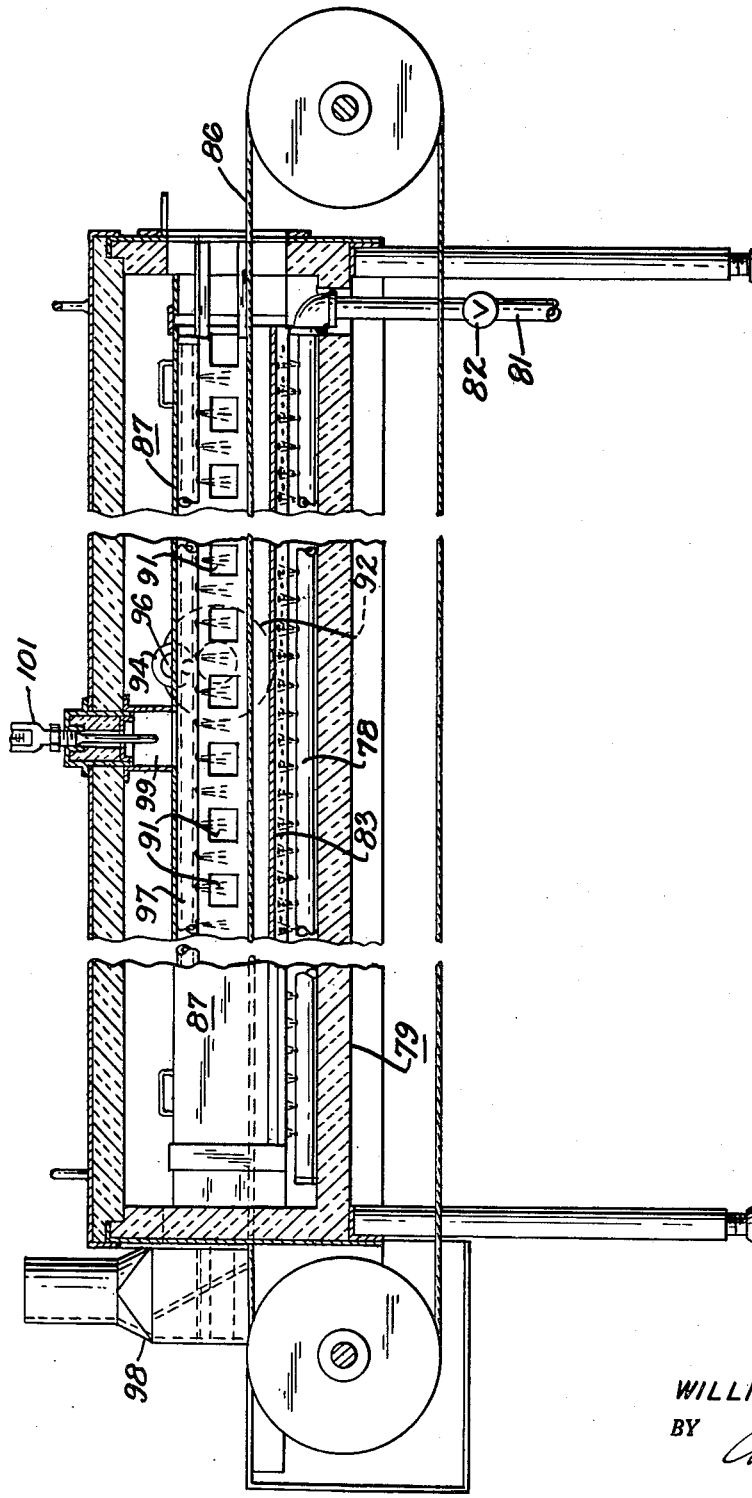
INVENTOR.
WILLIAM McK. MARTIN
BY
ATTORNEY United States Patent Office 2,771,645
Patented Nov. 27, 1956

2,771,645

APPARATUS FOR STERILIZING FOOD CONTAINERS

William McK. Martin, San Mateo, Calif., assignor to James Dole Engineering Co., a corporation of Nevada Application December 4, 1950, Serial No. 199,020

4 Claims. (Cl. 21—80)

This invention relates to the sterilization of containers, and more particularly to an improved apparatus and method for effecting sterilization of such containers in the type of non-pressurized aseptic processing system disclosed in applicant's co-pending applications, Serial No. 767,726, filed August 9, 1947, now Patent No. 2,549,216, dated April 17, 1951, and Serial No. 104,074, filed July 11, 1949, wherein all operations of sterilization of the containers and their covers, filling the containers with a sterile food product and covering the product filled containers are conducted under sterile or aseptic conditions in a unitary self contained apparatus at substantially atmospheric pressure. Steam or other gas heated by heating means to a sterilizing temperature above 212° F. is introduced into the apparatus to maintain sterile conditions therein and prevent inflow of outside air into the apparatus. In the case of steam, the heating means provides a super-heater which imparts heat energy to the steam in addition to the energy imparted thereto by heat of vaporization as a result of mere generation of the steam.

Summarizing this invention, it relates to the container sterilizing section or zone of the described type of apparatus, which comprises an enclosure having an entrance for the containers open to the atmosphere, and an exit therefor from which sterile containers are adapted to be conducted to another enclosure having filling mechanism for filling the containers with a sterile product under sterile conditions; the filling mechanism being preferably of the type disclosed in the aforementioned copending application, Serial No. 104,074. Means is provided in the container sterilizing enclosure to convey the containers therethrough in upright position from said entrance to the exit, so that a sterilizing medium in the enclosure can effect thorough sterilization of the containers.

To maintain sterile conditions in the container sterilizing enclosure, flow of gas is continually effected into the enclosure for preventing inflow of outside air through the container entrance and all other openings in the enclosure, and the gas is heated to a suitable sterilizing temperature above 212° F. at substantially atmospheric pressure for the purpose of effecting the sterilization. In the case of steam, the heating means is in the form of a super-heater for which any suitable heat source may be employed, such as gas or electrical means. Because of the super heating of the steam, it is not saturated steam but is dry steam that has outside heat energy imparted thereto in addition to the energy imparted to the steam by heat of vaporization as a result of mere generation of the steam.

Super-heating of the steam is necessary because at substantially atmospheric pressure, the steam would otherwise not be at a sufficiently high temperature above 212° F. to sterilize the containers within a time period practical for commercial operations. Other gases besides steam, such as sterile nitrogen, carbon dioxide gas, combustion gas, flue gas or even sterile air may be employed. These gases may also be heated to the desired temperature, by any suitable heating means such as gas or electrical means.

As is well known, sterilization is a function of time and temperature. Therefore, for any given residence time of the containers in the container sterilizing enclosure, the gas may be heated to the temperatures necessary to effect thorough sterilization of the containers. The residence time in the container sterilizer will depend upon the rate of feeding of the containers therethrough. Effective sterilization of the containers when the residence time in the container sterilizer is about 30 seconds, can be effected at a temperature of about 500° F. If the temperature is 550° F., the residence time need only be about 20 seconds. For commercial practicability, it is desirable that the residence time be relatively short; and it has been found that under most conditions, a temperature of about 350° F. to 500° F. provides a practical operating temperature with a residence time of about 1 minute to 30 seconds, respectively.

To impart heat as rapidly as possible to the containers, to shorten the residence time as much as possible which is desirable for commercial economy, the container sterilizer hereof is specially designed to direct jets of the hot sterilizing gas against the bottoms of the containers to heat thoroughly such bottoms so that the bottoms and the outside of the containers may become thoroughly sterilized. Also, jets of the hot gas are introduced over the tops of the containers into the mouths thereof to heat thoroughly the interior of the containers and sweep out air therefrom.

In the case of so-called conventional can type metal containers having seams at the bottom and flanges at the top, it is desirable to direct the jets of hot gas against the seams on the bottoms to insure thorough heat penetration into the folds of the seams to kill all bacteria therein; and in the apparatus of this invention, the jets of hot sterilizing gas are so arranged as to accomplish this result. Furthermore, to confine or retain the heat closely relative to the containers, the containers are continuously moved through a confining hood forming part of the sterilizing enclosure, and the sterilizing gas is introduced into this hood.

Reference is now made to the drawings for a detailed description of forms of apparatus which are particularly adapted for sterilization of open mouth can type metal containers; it being understood, however, that the principle of the apparatus and method of this invention is applicable to the sterilization of any other type of container.

In the drawings:

Fig. 2 is a vertical longitudinal section of the container sterilizer, taken in planes indicated by line 2—2 in Fig. 1. A portion of the filling section is shown in this view; and certain of the mechanism is omitted and other parts are shown broken away to illustrate more clearly the construction, and to shorten the view;

Fig. 3 is a fragmentary section taken in a plane indicated by line 3—3 in Fig. 2;

Fig. 5 is a transverse vertical section taken in planes indicated by line 5—5 in Fig. 2;

Fig. 6 is a plan view of the steam super-heater piping employed in the apparatus; the view being broken away to shorten the same;

Fig. 7 is a side elevational view of the piping shown in Fig. 6; the structure being broken away to shorten the view;

Fig. 8 is a side elevational view of steam super-heater piping mounted in the container sterilizer section but which is the super-heater for the steam conducted to the cover sterilizer section (not shown herein);

Fig. 9 is a fragmentary vertical sectional view taken in a plane indicated by line 9—9 in Fig. 5;

Fig. 11 is a fragmentary vertical longitudinal sectional elevation of such apparatus.

Figure 1:
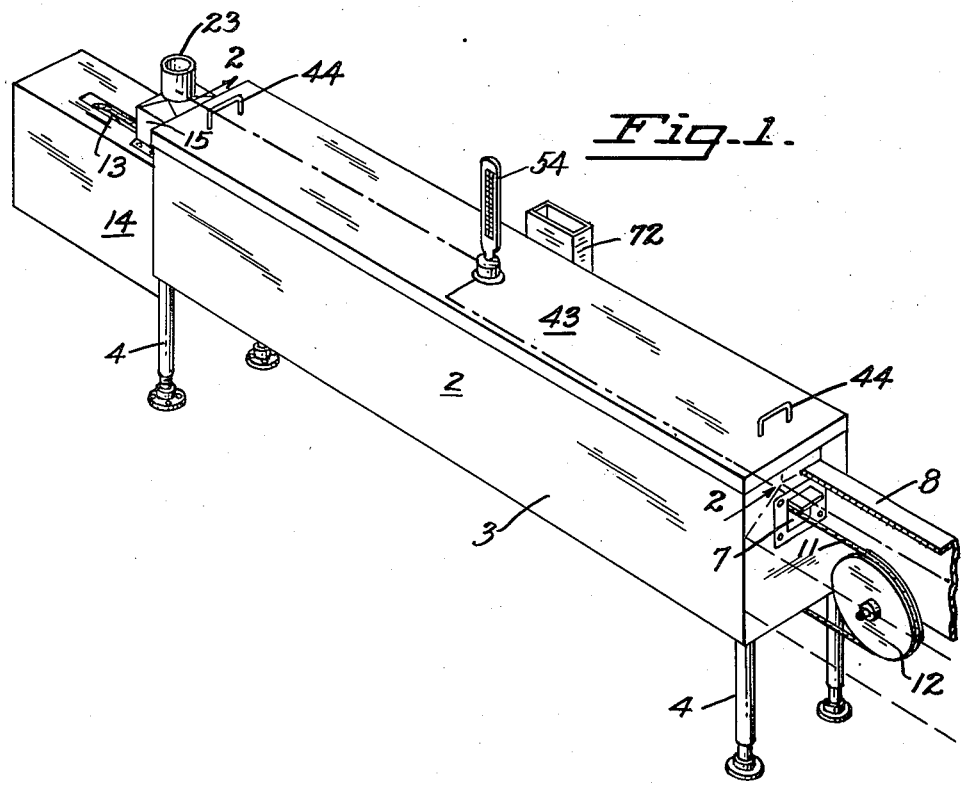
Fig. 1 is an isometric view of one embodiment of container sterilizing section employing super-heated steam as a heating medium; such section being shown in association with a portion of a filling section of the apparatus disclosed in the aforementioned copending applications. The filling section is shown more or less schematically in the view.
Figure 4:
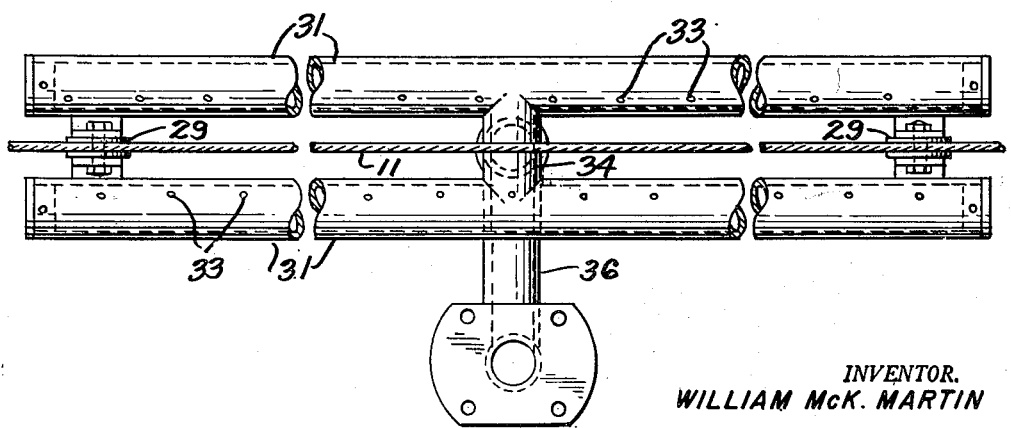
Fig. 4 is a plan view of the steam distributing piping to direct the jets of steam against the bottoms of the containers; the direction of the view being indicated by arrow 4 in Fig. 2.

The modification of Figs. 1 through 9 utilizes superheated steam as the gas for sterilizing the containers, and comprises an elongated main enclosure 2 having insulated walls 3, and which is mounted on suitable supports 4. In one end wall, the enclosure is provided with an entrance 6 for the containers and which is open to the atmosphere so that the inside of the enclosure is substantially at atmospheric pressure. At the opposite end, an exit 7 is provided which communicates with a container filling section 8 having filling mechanism therein for filling the containers with a sterile product under sterile conditions, as disclosed in the aforementioned copending applications.

Means is provided for continuously conveying a line of containers 9 through the container sterilizing section, comprising an endless cable 11 which passes about a drive pulley 12 mounted in filling section 8, and also about an idler pulley 13 mounted on a suitable support 14 attached to the entrance end of the sterilizing section. Drive pulley 12 is continuously driven with an uninterrupted motion by any suitable drive means (not shown) to conduct the containers continuously through the sterilizing section in upright position. In this connection, the containers are conducted to the receiving turn of endless cable 11 by any suitable transfer mechanism (not shown).

Adjacent entrance 6, the apparatus is provided with a hood 15 for venting the super-heated steam from the apparatus. As can be seen more clearly from Fig. 3, such hood contains top guide members 16 spaced apart a distance only slightly greater than the diameter of the containers, so that the usual top flanges 17 at the mouths of the containers may slide against the guide surfaces of the same. Similarly, spaced bottom guide members 18 are provided, and are spaced apart a distance only slightly greater than the diameter of the containers to engage the usual bottom seams 19 of the containers. Thus, the sides of the containers do not contact any of the guide members as they are conveyed therepast. As a result, should the containers be labeled by so-called lithographed or enameled decorative coatings, which are thermoplastic and consequently soften at the temperature of the container sterilizing section, such coatings will not become marred, as would otherwise be the case if the guides contacted against the sides of the containers. This manner of guiding the containers is also provided throughout the container sterilizing section, as will be subsequently explained.

A top guide 21 is also provided in hood 15, and is spaced from the tops of the containers so as normally not to contact the same, but merely to serve as a guide should any containers tend to bounce during conveyance thereof through the hood. An inclined apertured baffle plate 22 is provided about guides 16, 18 and 21 to direct escaping sterilizing gas from the sterilizing section, upwardly through vent outlet 23 at the top of hood 15.

The containers are conveyed through enclosure 2 while being housed in an elongated enclosing sterilizing unit 24 inside of enclosure 2 which confines the sterilizing gas in close contact with the containers in a manner to be explained. Sterilizer 24 comprises an elongated open mouth trough 26 which extends the length of enclosure 2, the ends of which are supported on suitable supports 27 at the ends of the enclosure. A drain pipe 28 is provided adjacent one end of trough 26 for the drainage of any steam condensate. Idler sheaves 29 are supported at suitable spaced intervals on the bottom of trough 26 to support the conveying reach of cable 11 between drive pulley 12 and idler pulley 13.

A pair of laterally spaced steam distributing pipes 31 is supported on the bottom of trough 26 on suitable bracket supports 32. These distributing pipes are closely adjacent the bottoms of the containers and are provided with angularly arranged outlet orifices 33 to direct jets of steam against the bottoms of the containers to heat thoroughly such bottoms including seams 19 of the containers, and also the outside of the containers. As can be seen from Fig. 4, orifices 33 in one pipe 31 are in staggered relationship with respect to the orifices in the other pipe 31, to produce a high degree of agitation of the steam jets in contact with the bottoms and sides of the containers, to thus enhance rapid heat transfer. Pipes 31 are connected by a cross pipe 34 in turn connected to an elbow 36 which provides means for connection of the distributing piping 31 to a super-heater in a manner to be explained.

Also, forming part of sterilizer unit 24 is an elongated hood 37 also inside enclosure 2 and which is in the shape of an inverted U in section, and comprising a long central section 37' extending substantially the length of the enclosure 2, and short end sections 37ª; the central section having end bands 37ᵇ overlapping and removably supporting such section on the end sections. The end sections are removably mounted adjacent the entrance 6 and exit 7, respectively, for a purpose to be explained. Preferably, the left hand end section 37ª appearing in Fig. 2 is formed as a structural integral unit with vent hood 15 which is also a removably mounted member; and the entrance 6 and the exit 7 are arranged to accommodate various sizes of these end units.

Hood 37 has parallel side walls 38, a top wall 39 and a flanged bottom section 41 of increased width and which is removably telescoped in trough 26. Handles 42 are provided on the top of hood section 37' to enable such section to be removed or replaced with reference to trough 26; and the top of enclosure 2 has a removable insulated cover 43 provided with handles 44 enabling the cover to be removed or replaced for access to removable hood section 37'.

A steam distributing pipe 46 extends along and is fixedly secured to the underside of top wall 39 of hood section 37' closely adjacent and over the tops of the containers, and is provided with discharge orifices 47 to direct jets of superheated steam into the mouths of the containers so as to heat thoroughly the interiors of the containers and sweep air out therefrom. Distributing pipe 46 is also provided with a connecting elbow 48 adapted for connection to a superheater in a manner to be described.

It will be noted with reference to Fig. 5 that the hood forms a confining passageway for the sterilizing gas, so as to confine the heat thereof in close contact with the containers. The sides 38 of the hood are spaced apart a distance only slightly greater than the diameter of the containers, and provide guide surfaces for the containers as they are supported and conveyed through the sterilizer by conveying cable 11. Hence, only the flanges 17 and seams 19 of the containers can contact such side guide surfaces of hood 37, without contact of the sides of the containers against the guide surfaces, thus preventing marring of the sides of the containers should they be labeled in the manner previously related. To prevent possible striking of the containers against the entrance end of distributor pipe 46 as the containers are conducted into hood 37 from entrance 6, a top guide member 49 is provided in the hood end section 37ª adjacent such end of the distributor pipe, as can be seen more clearly from Fig. 2.

The detachable or removable mounting of hood section 37' as a unit together with top gas distributing pipe 46 which is fixedly mounted thereon, provides for replacement of the unit in accordance with the height and widths of containers being handled by the apparatus. In other words, if containers of one size are being sterilized, and it is desired to change over the apparatus to the handling of containers of a different size, this can be readily done by removing the previously installed hood including end sections 37ª, together with vent hood 15, and then reinstalling a different hood of a suitable size adapted for the handling of the different size containers to be sterilized in the succeeding operation.

In order to obtain a visual indication of the temperature in hood 37, a central portion thereof (Fig. 9) is provided with an aperture 51, and a well 52 is secured to the hood about such aperture; the top of well 52 being formed with a flange portion 53 adapted to rest against the underside of removable cover 43. A suitable thermometer 54 is mounted on the cover, and its heat sensitive portion 56 extends into well 52 so that one may readily obtain a reading of the temperature within hood 37. It will be noted that cover 43, since it is unattached to well 52, can be readily removed; and the various different hood assemblies which may be utilized with the apparatus for the reason previously explained, will have wells of varying height, so that the flange portions 53 of such wells may rest against the underside of cover 43.

Means is provided for super-heating the steam which is introduced into container sterilizer hood 37 by means of the distributing pipe 46 at the top of the hood and the distributing pipes 31 adjacent the underside of the hood, comprising heating mechanism 57 underneath hod 37, in the form of conventional ribbon type gas burner tubes 58 mounted adjacent the bottom of enclosure 2, and having gas inlet pipe 59 connected to gas control valve 61. A super-heater is mounted in enclosure 2 above heating mechanism 57, and comprises a plurality of continuous coils of piping 62 arranged in two overlying sections having steam inlet connection 63 and a T-shaped discharge connection 64 to which the steam distributing pipes 31 and the steam distributing pipe 46 are detachably connected by bolts 66 (Fig. 5).

For this purpose, the connectable ends of elbows 36 and 48 of piping 31 and 46, respectively, are formed with suitable flanges 67 adapted to engage over the ends of T connection 64 of the super-heater. Thus, removal of hood 37 merely requires disconnection of elbow 48 from the T 64, which can be readily accomplished. Super-heater 62 is supported on suitable brackets 68; and baffles 69 are provided at spaced intervals along enclosure 2, having projecting portions 71 in the spaces between the superheater piping 62. Thus, hood 37 is exposed to the combustion gases; and the combustion gases from the burner 58 pass upwardly and around super-heater piping 62 between baffles 69, and can escape through flue 72 communicating with an aperture in a side wall of enclosure 2.

An additional steam superheater comprising a single coil of piping 73 (Fig. 8) is provided in the container sterilizer section, and is positioned over a ribbon type gas burner tube 74. This superheater has inlet steam connection 76 and outlet steam connection 77, and is for the purpose of superheating the steam for the cover sterilizing section (not shown) of the entire apparatus, as is disclosed in the aforementioned copending applications. Although a gas burner is disclosed as the heating mechanism for superheating the steam, it is apparent that any other heating mechanism, such as electrical heating means may be employed, as it is only necessary to provide outside heating means for the steam to superheat it to a sufficiently high sterilizing temperature above 212° F. at substantially atmospheric pressure.

The sterilizing temperature in hood 37 may be automatically controlled by the provision of any suitable thermostat control 77' in T conection 64. Such control may be connected in any usual manner to control automatically the operation of burner control valve 61. In this connection, as is explained in the aforementioned applications, it is preferred to reduce the pressure of the steam before it enters the superheater, so that when injected into the hood 37, the steam will be only a few hundredths of a pound pressure above atmospheric pressure, so as to obviate the possibility of knocking over the containers.

Figure 10:
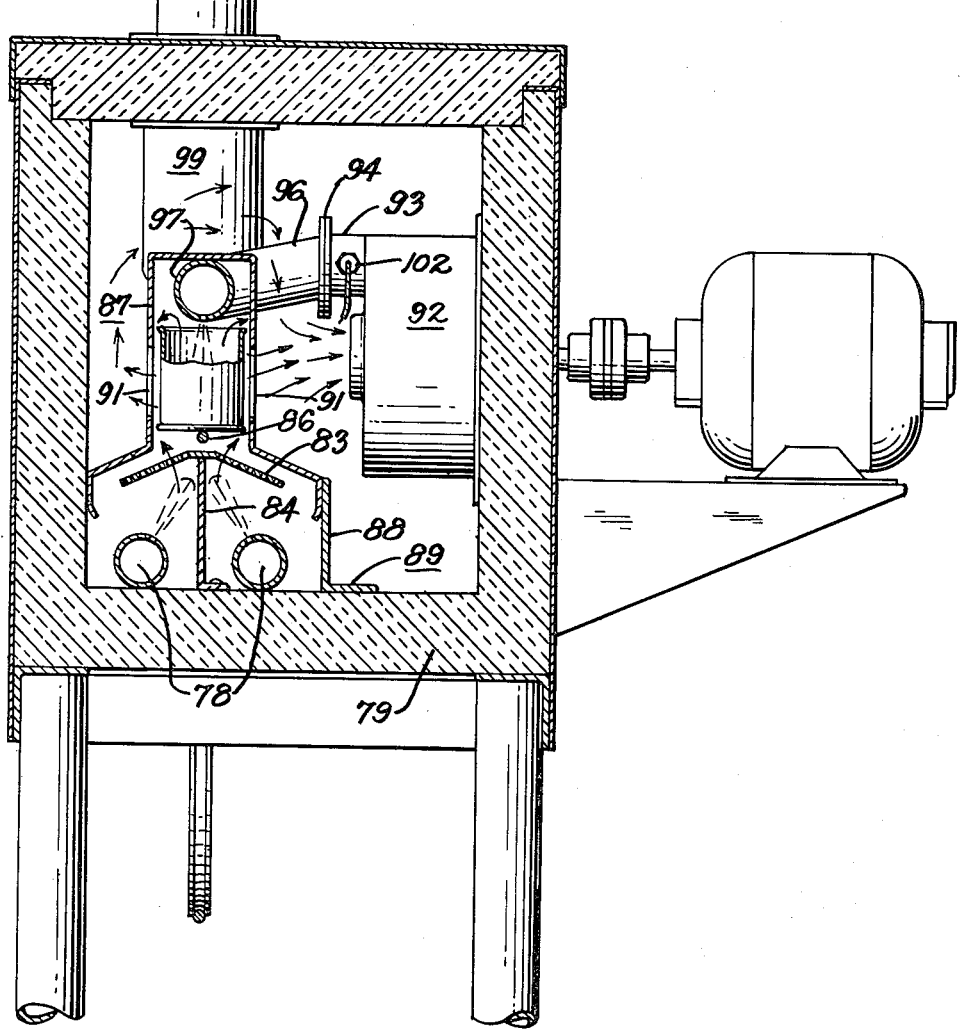
Fig. 10 is a transverse vertical sectional view of another embodiment of the container sterilizer wherein combustion gas is employed to sterilize the containers.

A modified form of apparatus is disclosed in Figs. 10 and 11 in which hot combustion gases are utilized as the sterilizing gas, and the gas burner is utilized for generating and heating the combustion gases. In this modification, the construction of the container sterilizer is generally the same as in the previously described modification. Hence, it will be described only insofar as it differs from the previously described modification. The source of heat comprises a pair of ribbon type gas burner tubes 78 extending along the bottom of enclosure 79 below the bottoms of the containers, and having a gas inlet connection 81 controlled by suitable valve 82.

The jet orifices of burner tubes 78 are angularly inwardly inclined to direct the burning combustion gases against the bottoms of the containers; and a diffusion screen 83 mounted on suitable bracket 84 is positioned over burner tubes 78. Conveying cable 86 is located above screen 83.

Container sterilizer hood 87 functions similarly to the previously described hood, and is removably mounted in the same manner, having a telescopic fit between a side wall of the enclosure and a flange 88 of an angle member 89 extending along the length of the enclosure. The bottom of hood 87 is open. As a result, the hot combustion gases from the burner flow into the hood and contact directly against the bottoms of the containers, their seams and outer sides, and flow outwardly through suitable side apertures 91 formed in the side walls of the hood.

These combustion gases are circulated by means of a suitable blower located in blower chamber 92 which discharges the gases through blower outlet pipe 93 having a detachable flange connection 94 with a pipe 96 in turn connected to sterilizing gas distributing pipe 97 secured to the underside of the top of hood 87 and extending along the length thereof; pipe 97 being removable as a unit with hood 87. The hot sterilizing gases are ejected from orifices in the underside of distributing pipe 97, and also flow outwardly through side apertures 91 of hood 87. Thus, the hot sterilizing gases are continually recirculated, and the burner not only provides a source of gas but a means for heating the same. Combustion gases with entrained air from the containers are discharged through a vent hood 98 adjacent the entrance of the container sterilizer, and which is of the construction previously described.

A thermometer receiving well 99 is secured to the top of hood 87; and the temperature can be visually determined by thermometer 101 arranged in the manner described with respect to the preceding modification. As with respect to the previously described hood, hood 87 may be readily replaced in accordance with the can sizes being handled by detachment of pipe 96 and replacement by a similar unit. A suitable thermostat control 102 may be provided in fixed outlet pipe 93 to control automatically the temperature by operation of gas inlet control valve 82.

I claim:

1. In apparatus of the character wherein sterilized open mouth containers are carried to a filling mechanism for filling the containers with a sterile food product under sterile conditions and sterile covers are applied to the product filled containers, a food container sterilizer comprising a main enclosure housing, container conveying means within said housing for supporting the containers in upright position, gas distributing means within and extending along said housing, a hood separate from said housing which extends within said housing, said hood having a top wall over said distributing means and side walls one at each side of said conveying means thereby providing a heat confining pasageway for said containers on said conveying means, said side walls of said hood providing guide means against which said containers on said conveyor can slide and said gas distributing means having orifices leading into said hood above and below said containers to inject heated sterilizing gas into the mouths of said containers to heat the inside of the containers and sweep out air therefrom, and to direct sterilizing gas against the bottoms of said containers on said conveyor.

2. Apparatus as claimed in claim 1 wherein said gas distributing means is located within said hood.

3. Apparatus as claimed in claim 1 wherein said main enclosure housing is provided with heat insulation means.

4. In apparatus of the character wherein sterilized open mouth containers are carried to a filling mechanism for filling the containers with a sterile food product under sterile conditions and sterile covers are applied to the product filled containers, a food container sterilizer comprising a main enclosure housing, container conveying means within said housing for supporting the containers in upright position, gas distributing means within and extending along said housing, a hood separate from said housing which extends within said housing, said hood having a top wall over said distributing means and side walls one at each side of said conveying means thereby providing a heat confining passageway for said containers on said conveying means, said side walls of said hood providing guide means against which said containers on said conveyor can slide and said gas distributing means having orifices leading into said hood above and below said containers to inject heated sterilizing gas into the mouths of said containers to heat the inside of the containers and sweep out air therefrom, and to direct sterilizing gas against the bottoms of said containers on said conveyor, a relatively wide bottom trough portion on which said hood member is removably mounted, and said gas distributing means including an upper distributing pipe attached to said removable hood member to permit ready replacement of various size hood members to accommodate to different size containers through said hood portion.

References Cited in the file of this patent

UNITED STATES PATENTS

| | | |
|---|---|---|
| 880,713 | Blair | Mar. 3, 1908 |
| 976,001 | Schmitt | Nov. 15, 1910 |
| 1,270,797 | Dunkley | July 2, 1918 |
| 1,309,785 | Taylor | July 15, 1919 |
| 1,779,152 | Wheeler | Oct. 21, 1930 |
| 1,902,625 | Dunham | Mar. 21, 1933 |
| 2,021,292 | Cook | Nov. 19, 1935 |
| 2,337,170 | Wareham | Dec. 21, 1943 |
| 2,592,687 | Halmrast | Apr. 15, 1952 |

FOREIGN PATENTS

| | | |
|---|---|---|
| 441,499 | Great Britain | Jan. 21, 1936 |
| 587,056 | Great Britain | Apr. 11, 1947 |